United States Patent
Abe et al.

(10) Patent No.: US 7,841,166 B2
(45) Date of Patent: Nov. 30, 2010

(54) JET-TYPE STEAM ENGINE

(75) Inventors: Makoto Abe, Kanagawa (JP); Yasushi Yamamoto, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 356 days.

(21) Appl. No.: 11/920,440

(22) PCT Filed: May 19, 2006

(86) PCT No.: PCT/JP2006/310504

§ 371 (c)(1),
(2), (4) Date: Nov. 15, 2007

(87) PCT Pub. No.: WO2006/126658

PCT Pub. Date: Nov. 30, 2006

(65) Prior Publication Data

US 2009/0056308 A1    Mar. 5, 2009

(30) Foreign Application Priority Data

May 25, 2005    (JP) .............................. 2005-152544

(51) Int. Cl.
  B63H 11/12    (2006.01)
  B63H 11/00    (2006.01)
  F02K 9/50    (2006.01)
  F01K 23/06    (2006.01)
  F01D 1/18    (2006.01)
  F03B 1/00    (2006.01)

(52) U.S. Cl. .............................. 60/227; 60/221; 60/670; 415/80

(58) Field of Classification Search ................ 60/39.44, 60/227; 415/80, 82
See application file for complete search history.

(56) References Cited

U.S. PATENT DOCUMENTS 3,079,751 A * 3/1963 Lewis .......................... 60/227

(Continued)

FOREIGN PATENT DOCUMENTS

DE    39 35048 A1    8/1986

(Continued)

*Primary Examiner*—Thomas E Denion
*Assistant Examiner*—Christopher Jetton
(74) *Attorney, Agent, or Firm*—McGinn IP Law Group PLLC

(57) ABSTRACT

A simply constituted steam engine efficiently obtains mechanical energy not only from a heat source of a high temperature but also from the exhaust heat of an internal combustion engine and various kinds of heat sources of a low-temperature state such as the solar heat. In the engine, a rotor (5) having a folded jet pipe (51) is rotatably supported in a sealed container (1) filled with a liquid. A heating portion (9) is inserted in a center cylinder (50) at the center of the rotor, and a fluid of a high temperature is passed therethrough to vaporize the liquid sucked through the suction pipe (52) of the rotor (5). A mixture of steam and liquid is jetted from the jet pipe (51) due to the pressure of the steam that is vaporized to rotate the rotor (5). A check valve (53) for jetting and a check valve (54) for suction are disposed at the ends of the jet pipe (51) and the suction pipe (52). The jetted steam is guided to a condenser (2) disposed on the sealed container (1), and is condensed and is refluxed into the sealed container (1). A vacuum pump (23) is connected to the condenser (2), and the pressure in the sealed container is held at the saturated steam pressure.

6 Claims, 3 Drawing Sheets

U.S. PATENT DOCUMENTS

| | | | |
|---|---|---|---|
| 3,898,800 A * | 8/1975 | Payne | 60/227 |
| 4,057,961 A * | 11/1977 | Payne | 60/221 |
| 4,640,667 A * | 2/1987 | Trepp | 417/52 |
| 6,565,310 B1 * | 5/2003 | Davidow | 415/80 |

FOREIGN PATENT DOCUMENTS

| | | | |
|---|---|---|---|
| DE | 3505201 A1 | 9/1990 | |
| JP | 59-90710 | 5/1984 | |
| JP | 59-142404 | 9/1984 | |
| JP | 59-142405 | 9/1984 | |
| JP | 59-168205 | 9/1984 | |
| JP | 61019954 A * | 1/1986 | |
| JP | 2001-20706 | 1/2001 | |
| JP | 2002-221043 | 8/2002 | |

* cited by examiner

JET-TYPE STEAM ENGINE

FIELD OF THE INVENTION

This invention relates to a steam engine for converting the thermal energy into the mechanical energy such as rotational energy and, more particularly, to a steam engine for efficiently generating the mechanical energy from a heat source of relatively low temperatures.

BACKGROUND ART

In recent years, technologies have been developed for utilizing a variety of energy resources from viewpoint of environmental measure, saving resources and saving energy. Among them is a technology for taking out the mechanical energy from the thermal energy present in the natural world, such as solar heat. Technologies have also been developed to improve the thermal efficiency of an internal combustion engine by generating the power by utilizing the heat wasted into the exhaust gas or the cooling water of an internal combustion engine such as diesel engine, and by recovering the power.

A heat engine is used for converting the thermal energy into the mechanical energy such as rotational energy. The heat engine such as the internal combustion engine or the steam turbine that uses an ordinary fuel such as petroleum, natural gas or the like, is the one in which the fuel is burned to produce an operation fluid of a high temperature and a high pressure and the thermal energy is converted into the mechanical energy, and features a high heat efficiency since the mechanical energy is taken out from the heat source in the state of a high temperature. However, the temperature of the thermal energy in the natural world and the exhaust heat of the internal combustion engine are, usually, not so high, i.e., these are the thermal energy in a low-temperature state. In order to efficiently take out the mechanical energy from such heat sources, therefore, it becomes necessary to use a heat engine adapted to the heat source in a low-temperature state.

The engine disclosed in JP-A-2001-20706 is a heat engine for generating the mechanical energy from the heat source in a low-temperature state. As shown in FIG. 4, this engine comprises a heating portion 101 and a cooling portion 102 which are coupled together through nozzles 103. A turbine 106 is arranged in the cooling portion 102 at a position facing the nozzles 103, and rotates together with magnets 107. On the inside of the magnets 107, stationary generating coils 110 are arranged facing thereto, and the magnets 107 and the generating coils 110 together constitute a generating device. The heating portion 101 and the cooling portion 102 are sealed, respectively. Water 104 which is an operation fluid is fitted therein, and the air inside is evacuated by a vacuum pump. Many heat pipes 105 are mounted on the upper side of the cooling portion 102 to radiate the heat.

The heating portion 101 and the cooling portion 102 as a whole constitute a heat pipe, and water 104 becomes steam being heated in the heating portion 101 from the lower side thereof creates a high-speed stream which is jetted to the blades of the turbine 106 from the nozzles 103. Therefore, the turbine 106 and the magnets 107 rotate to produce the rotational energy which is, finally, converted into the electric energy by the magnets 107 and the generating coils 110, and is output to an external unit. The steam after having driven the turbine 106 is cooled down with the heat-radiating action of the heat pipes 105 and returns back to water. The condensate falls down to the lower side of the cooling portion 102 due to the gravity, and is refluxed into the heating portion 101 through the central portion.

The heat pipe that utilizes the vaporization and condensation of liquid contained in the sealed container is, usually, used as a heat carrying means, i.e., as a heat transfer device. However, the steam of liquid contained in the heat pipe moves accompanying large velocity energy and, therefore, the power can be taken out therefrom as described above. In this case, the mechanical energy can be taken out from the heat source in a low-temperature state.

The turbine disclosed in the above JP-A-2001-20706 is a so-called velocity type engine which utilizes the velocity energy of the operation fluid. To efficiently operate the turbine, the rotational speed of the turbine must be increased so that the circumferential velocity thereof is increased to match the velocity of the steam. However, when decreasing the diameter of the turbine to miniaturize it, the rotational speed of the turbine becomes very high and a large centrifugal force acts on the turbine and may break it down. Further, when the temperature of the heating portion is low and the steam is of a low temperature, the superheat of the steam is in a low degree, and water droplets tend to form due to the cooling. Water droplets that are formed come into collision with the turbine blades at high speeds, and the so-called is developed on the turbine blades due to the collision of water droplets.

When the heat engine is rotated being contained in a closed container, the rotary shaft must be supported by bearings having sealing performance. To support the rotary shaft that rotates at high speeds such as of the turbine, precision bearings are necessary. Namely, complex and expensive bearings must be used to support the rotary shaft maintaining sealing performance.

DISCLOSURE OF THE INVENTION

In order to solve the above problems inherent in the conventional heat engine, the steam engine of the present invention rotatably supports a rotor having jet pipes in a sealed container filled with a liquid, passes a heated fluid through a heating portion inserted in the central portion of the rotor, so that the liquid is vaporized and jetted from the jet pipes causing rotation of the rotor for converting the thermal energy into the rotational energy. That is, as described in claim 1, a steam engine of the present invention comprising "a sealed container containing a liquid therein, and a condenser arranged on the upper part of the sealed container communicated with the sealed container to condense the steam of the liquid, wherein
the sealed container contains a rotor that has:
a heating portion at the central portion thereof;
a folded jet pipe radially extending from the central portion and having a check valve for jetting at an end thereof; and
a folded suction pipe radially extending from the central portion and having a check valve for suction at an end thereof;
communication pipes through which a fluid of a high temperature passes are connected to the heating portion, and the rotor is dipped in the liquid and is supported by the sealed container so as to rotate with the communication pipes as a center being, and
the rotor is rotated by the heat added to the heating portion to take out the power."

The steam engine of the present invention is provided with the rotor having the jet pipe in the sealed container filled with the liquid, wherein the liquid is sucked through the suction pipe to the surrounding of the heating portion at the center of the rotor and is vaporized. Due to the stream of a high pressure that is vaporized, a mixture in a state where the liquid and the steam are mixed together is jetted from the jet pipe, and the rotational force is obtained by the reaction thereof. The mixture that is jetted contains much liquid, and its mass is much greater than that of the steam. Therefore, the rotational force obtained by the reaction, i.e. the rotational torque becomes much higher than that of when the steam only is jetted. Accordingly, a large torque is obtained even when the rotor rotates at low speed, and the steam engine can be efficiently operated even at low speed unlike the turbine which converts the velocity energy of steam into the rotational energy.

Further, the steam engine rotates the rotor comprising the jet pipe and the suction pipe that extends radially from the central portion thereof, and is simple in the constitution since it has neither the nozzles nor the stator blades that are included in the ordinary turbines. The rotational speed is relatively lower than that of the turbine, and precision bearings for high speeds do not have to be employed for supporting the rotary shaft. Besides, no erosion is caused by the collision of water droplets.

Communication pipe are connected to the heating portion provided at the central portion, and the exhaust gas of, for example, an internal combustion engine or a hot fluid heated by the geothermal heat is introduced to the heating portion through the communication pipe. The communication pipes are penetrating through the center of rotation of the rotor, and can be utilized as a rotary support shaft of the rotor and can, further, be fixed to the sealed container. Therefore, the liquid sealing structure between the communication pipes and the sealed container becomes simple.

A check valve for suction is disposed in the suction pipe of the steam engine of the invention, and a check valve for jetting is disposed in the jet pipe. The liquid sucked through the suction pipe is heated by the heating portion at the center of the rotor and becomes the steam to elevate its pressure. However, no counter flow is produced from the suction pipe since the check valve for suction is disposed at the end of the suction pipe. When the pressure of the steam is elevated to a sufficient degree, the steam expands through the jet pipe and is jetted in the form of a mixture of liquid and steam into the liquid through the check valve for jetting, and imparts the rotational torque to the rotor. That is, the liquid stays near the heating portion until it becomes the steam of a high pressure, and the heat can be transferred to a sufficient degree even if the heating portion is in a low-temperature state.

As described in claim 2, it is desirable that a vacuum pump is connected to the condenser, and the pressure in the sealed container and in the condenser is set to be a saturated steam pressure of the liquid. The vacuum pump is connected to the condenser to evacuate the gas such as the air from the condenser, and the pressure in the sealed container and in the condenser is set to be the saturated steam pressure of the liquid that is contained therein. In this case, the boiling point of the liquid decreases and the liquid becomes the steam even at low temperatures. As a result, the liquid easily turns into the steam even when the temperature of the heating portion is not so high, and the engine is efficiently operated to take out the rotational energy.

As described in claim 3, a plurality of heat transfer plates having holes through which the fluid of a high temperature passes can be provided in the heating portion. The fluid of a high temperature flows into the heating portion in the steam engine of the present invention, and the liquid surrounding the heating portion is heated. Upon providing the interior of the heating portion with a plurality of heat transfer plates having holes through which the fluid of a high temperature flows, therefore, the heat of the fluid is transferred to the liquid from the tubular wall of the heating portion via the heat transfer plates, realizing a favorable transfer of heat. Besides, a turbulent flow occurs at the time when the fluid of a high temperature passes through the holes further improving the transfer of heat from the fluid to the heat transfer plates.

As described in claim 4, further, it is desirable that the jet pipe and the suction pipe are formed in a streamline shape in cross section thereof. The steam engine of the present invention rotates, in the liquid, the rotor comprising the jet pipe and the suction pipe. Upon forming the jet pipe and the suction pipe in the streamline shape in cross section, therefore, the fluid resistance which the rotor receives from the liquid decreases, the power loss decreases, and the thermal efficiency of the engine can be improved.

BEST MODE FOR CARRYING OUT THE INVENTION

Figure 1:
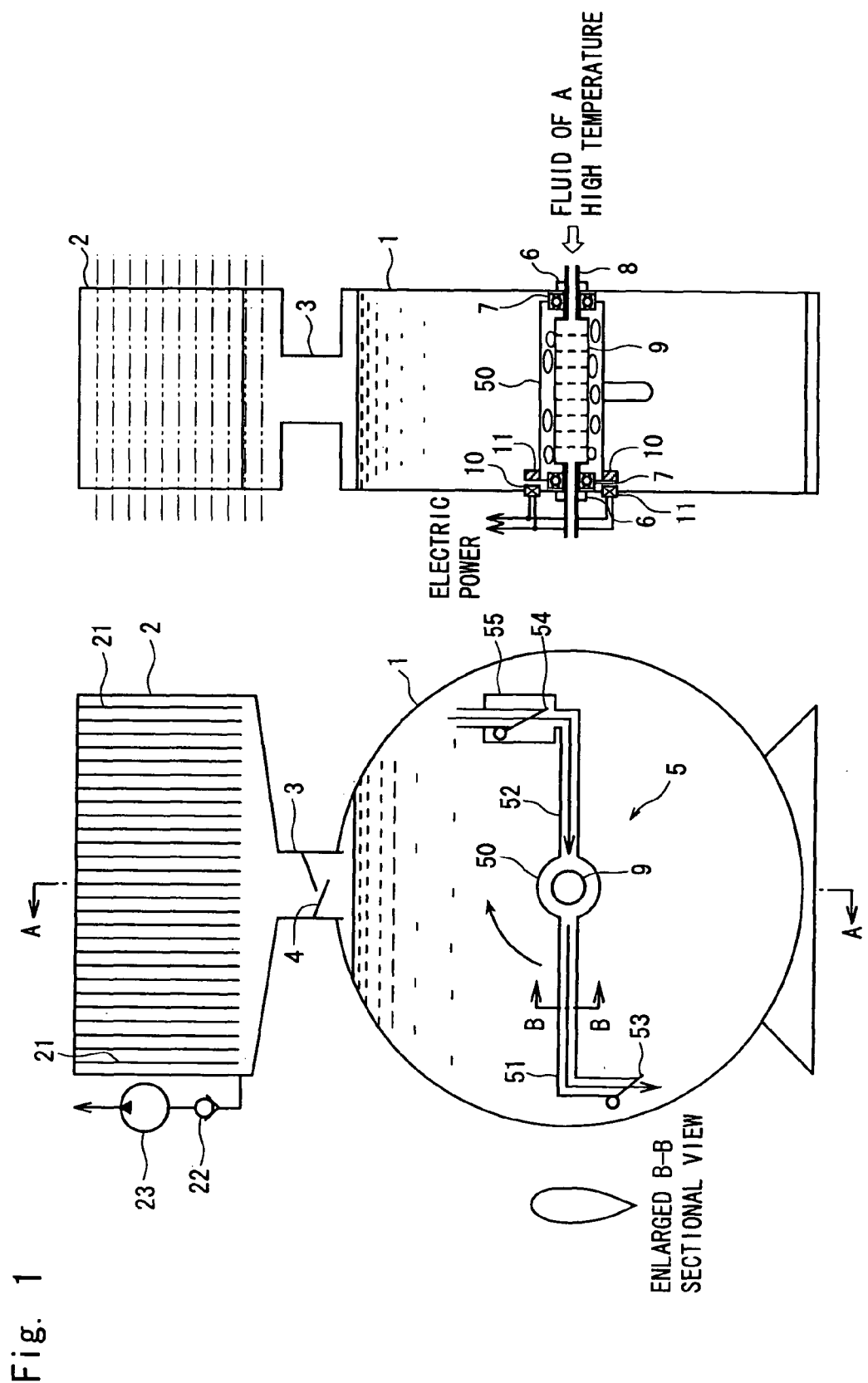
FIG. 1 is a sectional view of a steam engine of the present invention.

An embodiment of the invention will now be described in detail with reference to the drawings. A sectional view of the steam engine of the present invention is shown in the center of portion in FIG. 1, and a sectional view along A-A is shown on the right side thereof. Further, a sectional view of a jet pipe on an enlarged scale (B-B cross section) is shown on the left side. FIG. 2 is a view illustrating in detail the central portion of the rotor and the heating portion in the steam engine, and FIG. 3 is a perspective view illustrating the heating portion and the communication pipes in a partly cut-away manner.

The steam engine comprising a sealed container 1 of a circular shape in cross section, and contains water therein as a liquid (operation fluid) to be heated which is nearly filling the sealed container 1. A condenser 2 is installed on the upper part of the sealed container 1 to condense the steam into the condensate. The condenser 2 is coupled to the sealed container 1 through a short pipe 3. A plurality of baffle plates 4 are provided in the short pipe 3 maintaining a gap preventing water in the state of liquid from entering into the condenser 2 but permitting the condensate refluxing into the sealed container 1 from the condenser 2.

A rotor 5 is disposed in the circular sealed container 1 being dipped in water. The rotor 5 comprising a center cylinder 50 at the central portion thereof, and a jet pipe 51 and a suction pipe 52 extending in the radial direction are connected to the center cylinder 50. As shown in the diagram in the center of FIG. 1, the jet pipe 51 and the suction pipe 52 are extending in the directions opposite to each other at an angle of 180 degrees, and their ends are folded at right angles. Though the ends are folded at right angles in this embodiment, they may be mildly folded.

A check valve 53 for jetting is attached to the end of the jet pipe to permit the flow in only a direction in which the mixture of steam and water is jetted from the jet pipe 51, and a check valve 54 for suction is attached to the end of the suction pipe to permit the flow of water toward the center cylinder 50 only. To attach the check valve 54 for suction, a suction chamber 55 of a diameter larger than that of the suction pipe is formed at the end of the suction pipe 52. As shown in the view in the left side of FIG. 1, further, the jet pipe 51 and the suction pipe 52 are formed in a streamline shape in cross section. To form the stream line shape in cross section, a closure member of a streamline shape may be fixed to a pipe of a circular shape in cross section.

Figure 2:
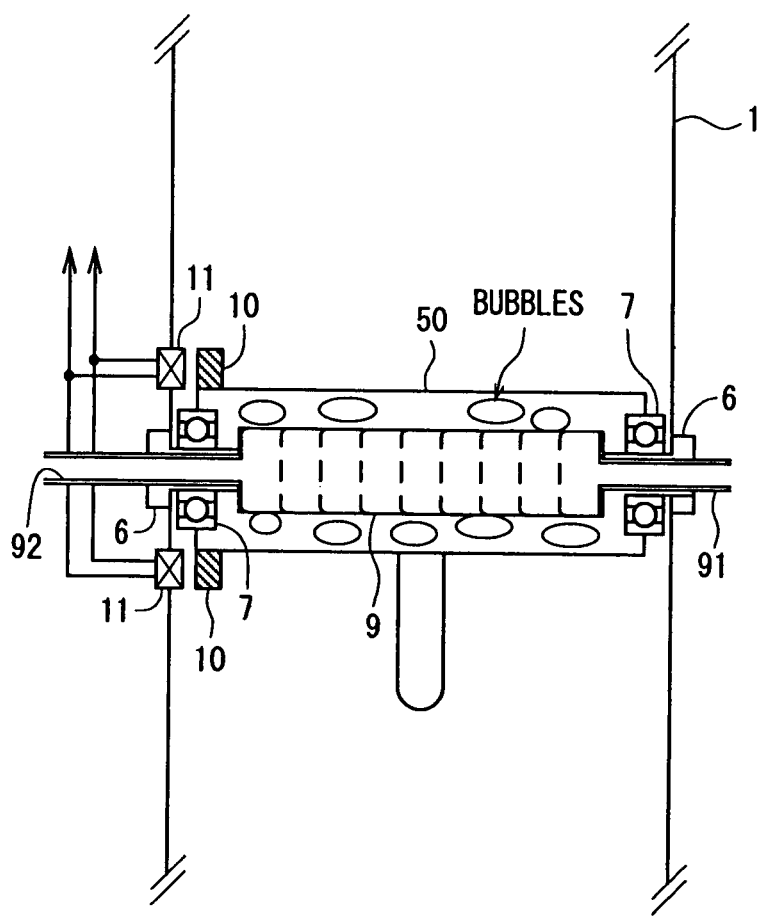
FIG. 2 is a view illustrating in detail the vicinities of a heating portion in the steam engine of the present invention.
Figure 3:
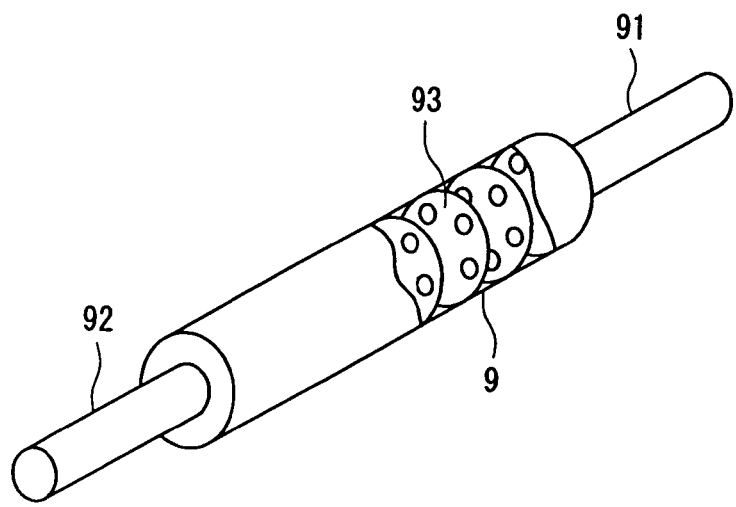
FIG. 3 is a perspective view illustrating the heating portion in a partly cut-away manner of the steam engine of the present invention.
Figure 4:
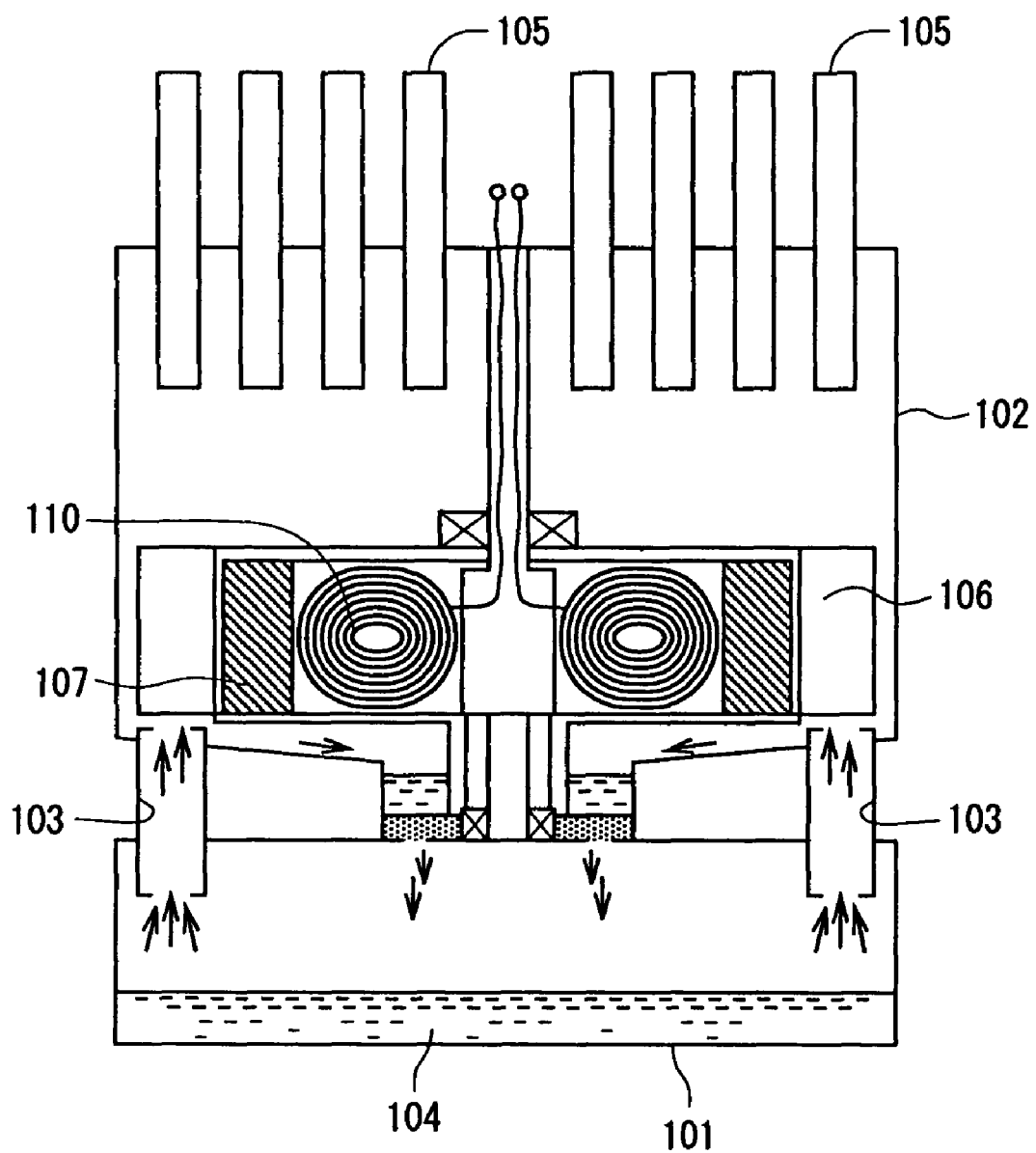
FIG. 4 is a view illustrating an example of a conventional steam engine.

As shown in the diagram in the right side of FIG. 1 and FIG. 2, the center cylinder 50 of the rotor 5 is rotatably supported by sleeves 6 fixed to the right and left side walls of the sealed container 1 through bearings 7 having sealing function. A circular pipe that constitutes a heating portion 9 is inserted in the center cylinder 50 in alignment therewith. As also shown in FIG. 3, communication pipes 91 and 92 are fixed by welding or the like to both ends of the circular pipe of the heating portion 9, the communication pipes 91 and 92 being inserted in the right and left sleeves 6 and closely fitted to the inner surfaces of the sleeves 6. Therefore, the communication pipes 91 and 92 play the role of reinforcing the sleeves 6, and bear a part of the axial load of the rotor 5 acting on the sleeves 6.

The fluid of a high temperature such as the exhaust gas of an internal combustion engine or the like is fed from the communication pipe 91 into the heating portion 9, and water sucked into the center cylinder 50 is heated to generate the steam. A plurality of heat transfer plates 93 forming holes for passing the fluid are arranged in the inside of the heating portion 9. The fluid of a high temperature produces turbulence as it flows passing through the holes in the heat transfer plates 93. Besides, the heat transfer areas are greatly increasing accelerating the transfer of heat from the fluid of a high temperature to water in the center cylinder 50. After having transferred the heat, the fluid is discharged to the outer side through the communication pipe 92. In this embodiment, the communication pipes 91 and 92 have a diameter smaller than that of the cylinder of the heating portion 9. Depending upon the cases, however, the tubes of the same diameter may be used.

A plurality of magnets 10 are fixed to an end on the left side of the center cylinder 50 maintaining a gap in the circumferential direction, and rotate together with the rotor 5. A plurality of generating coils 11 are mounted on the left side wall of the sealed container 1 at positions facing the magnets 10. The rotational energy of the rotor 5 is output as electric energy to an external unit due to the interaction between the magnets 10 and the generating coils 11. Though an illustration is omitted here, the magnets 10 and the generating coils 11 are contained in a casing surrounding them to prevent infiltration of water and the like.

The condenser 2 installed on the upper side of the sealed container 1 has an outer wall made of aluminum or the like having good heat transfer property for improving heat radiating performance, and many plate-like heat transfer fins 21 are provided therein in the vertical direction. Depending upon the cases, the heat radiating fins may be attached to the outer walls as indicated by two-dot chain lines in the view in the right side of FIG. 1. The bottom wall of the condenser 2 is inclined so as to collect the condensate into the short pipe 3. Further, the interior of the condenser 2 is connected to a vacuum pump 23 via a check valve 22 to evacuate gases such as the air and the like and to maintain the pressure in the condenser 2 and the sealed container 1 at the saturated steam pressure.

Next, described below is the operation of the steam engine of the present invention.

Water in the sealed container 1 is fed into the center cylinder 50 of the rotor 5 that is rotatably supported through the check valve 54 for suction and the suction pipe 52. Fluid of a high temperature is fed to the heating portion 9 inserted in the center cylinder 50, and the temperature thereof is elevated. Water that is fed comes in contact with the heating portion 9 and partly becomes the steam. The pressure in the center cylinder 50 increases accompanying generation of the steam. As the pressure exceeds a predetermined value, the check valve 53 for jetting opens, and the steam passes through the folded jet pipe 51 while expanding and is jetted at a high speed from the end thereof in a state of being mixed with water. Due to the inertia of the jetted mixture of steam and water, the pressure decreases in the center cylinder 50, water is sucked again through the suction pipe 52, and the actions of jetting and suction are repeated hereinafter.

The rotational torque acts on the rotor 5 due to the reaction of the jetted mixture, and the rotor 5 rotates clockwise in FIG. 1. The mixture that is jetted contains water which is a liquid in large amounts, water having a specific gravity much larger than that of the steam. Therefore, the momentum of the mixture and the rotational torque that acts on the rotor 5 becomes very large. A required power can, therefore, be taken out even when the rotor 5 is rotating at a low speed. The rotational energy of the rotor 5 is taken out as electric energy to an external unit due to the electromagnetic interaction between the magnets 10 that rotate together with the rotor 5 and the stationary generating coils 11.

The rotor 5 is dipped in water in the sealed container 1 and rotates in water and, therefore, receives fluid resistance of water. To decrease the resistance, the jet pipe 51 and the suction pipe 52 are formed in a streamline shape in cross section, decreasing the power loss caused by the fluid resistance. Further, water rotates, too, in the sealed container 1 accompanying the rotation of the rotor 5. However, the sealed container 1 has a circular shape in cross section and, therefore, water smoothly rotates decreasing the loss of power caused by the turbulence of water stream.

The steam jetted from the jet pipe 51 rises through water, is sent to the condenser 2 through the short pipe 3, and is cooled by the heat radiating fins 21 so as to be condensed into the condensate. The condensate flows down along the wall surface and is refluxed into the sealed container 1 through the short pipe 3. A vacuum pump 23 is connected to the condenser 2 to evacuate the air and the like, whereby the pressure in the condenser 2 and in the sealed container 1 decreases and is maintained at the saturated steam pressure. Accordingly, the boiling point of water in the sealed container 1 decreases and water vaporizes to generate the steam which produces the rotational torque for rotating the rotor 5 despite the heating portion 9 is in a state where the temperature is not so high. The exhaust heat of an internal combustion engine or the like is in many cases wasted being transferred to the fluid. According to this steam engine, however, a fluid is flown into the heating portion 9 to directly heat the water lending itself particularly well for recovering the exhaust heat.

INDUSTRIAL APPLICABILITY

According to the steam engine of the present invention as described above in detail, a rotor comprising a jet pipe is provided in a sealed container filled with the liquid, a fluid of a high temperature is passed through the heating portion inserted in the central portion of the rotor to vaporize the liquid, and a mixture of the liquid and steam is jetted from the jet pipe to rotate the rotor to thereby convert the heat added to the heating portion into the rotational energy. Therefore, the steam engine of the present invention can be used as a heat engine for taking out the power from various heat sources. Though the above embodiment has chiefly dealt with the case of converting the heat in a low-temperature state into the rotational energy, it needs not be pointed out that the steam engine of the present invention is capable of taking out the power by using a heat source of a high temperature based, for example, on the combustion or the like. As the liquid that serves as the operation fluid, further, a coolant such as Freon or the like can be used not being limited to water, as a matter of course.

The invention claimed is:

1. A steam engine, comprising a sealed container filling with a liquid, and a condenser arranged on an upper part of the sealed container communicated with the sealed container to condense steam of the liquid, wherein said sealed container includes a rotor that includes:
    a heating portion at a central portion thereof;
    a folded jet pipe radially extending from the central portion and having a check valve for jetting at an end thereof; and
    a folded suction pipe radially extending from the central portion and having a check valve for suction at an end thereof,
    wherein communication pipes, through which a fluid of a high temperature passes, are connected to said heating portion, and said rotor is dipped in the liquid and is rotatably supported by said sealed container with said communication pipes as a center, and
    wherein said rotor is rotated by heat added to said heating portion to take out power.

2. The steam engine according to claim 1, wherein a vacuum pump is connected to said condenser, and pressure in said sealed container and in said condenser is set to be a saturated steam pressure of the liquid.

3. The steam engine according to claim 1, wherein a plurality of heat transfer plates having holes, through which a fluid of a high temperature passes, is provided in said heating portion.

4. The steam engine according to claim 1, wherein said jet pipe and said suction pipe are formed in a streamline shape in cross section thereof.

5. The steam engine according to claim 2, wherein a plurality of heat transfer plates having holes, through which a fluid of a high temperature passes, is provided in said heating portion.

6. The steam engine according to claim 2, wherein said jet pipe and said suction pipe are formed in a streamline shape in cross section thereof.

* * * * *